(12) United States Patent
Thompson et al.

(10) Patent No.: US 8,449,349 B2
(45) Date of Patent: May 28, 2013

(54) ELEVATOR LOAD BEARING MEMBER HAVING A JACKET WITH AT LEAST ONE ROUGH EXTERIOR SURFACE

(75) Inventors: Mark S. Thompson, Tolland, CT (US); William A. Veronesi, Hartford, CT (US); John Pitts, Avon, CT (US); Ary O. Mello, Farmington, CT (US); Hugh J. O'Donnell, Longmeadow, MA (US); John P. Wesson, Vernon, CT (US); William C. Perron, Bristol, CT (US); Douglas E. Logan, Bristol, CT (US); Kathryn Rauss Sherrick, Bristol, CT (US); Richard Phillips, Trevaux (CH); Peter Schreiner, Munchenstein (CH); Pierangelo Jotti, Niederwill (CH)

(73) Assignee: Otis Elevator Company, Farmington, CT (US)

( * ) Notice: Subject to any disclaimer, the term of this patent is extended or adjusted under 35 U.S.C. 154(b) by 1331 days.

(21) Appl. No.: 10/588,806

(22) PCT Filed: Mar. 15, 2004

(86) PCT No.: PCT/US2004/008167
§ 371 (c)(1),
(2), (4) Date: Sep. 16, 2008

(87) PCT Pub. No.: WO2005/094255
PCT Pub. Date: Oct. 13, 2005

(65) Prior Publication Data
US 2009/0120731 A1    May 14, 2009

(51) Int. Cl.
*B24B 1/00*    (2006.01)

(52) U.S. Cl.
USPC .............. 451/28; 187/251; 187/266; 187/411

(58) Field of Classification Search
USPC ............................ 451/28; 187/251, 266, 411
See application file for complete search history.

(56) References Cited

U.S. PATENT DOCUMENTS 5,566,786 A * 10/1996 De Angelis et al. .......... 187/266
5,716,570 A    2/1998 Peiffer et al.
(Continued)

FOREIGN PATENT DOCUMENTS

DE    950602    10/1956
JP    61186855    11/1986
(Continued)

OTHER PUBLICATIONS

PCT International Search Report for International Application No. PCT/US04/08167 mailed Nov. 29, 2005.
(Continued)

*Primary Examiner* — Lee D Wilson
*Assistant Examiner* — Shantese McDonald
(74) *Attorney, Agent, or Firm* — Carlson, Gaskey & Olds PC

(57) ABSTRACT

An elevator load bearing member assembly includes at least one roughened surface (46) on a polyurethane jacket (44). In one example, mechanical roughening is used to roughen the surface (46) after the jacket has been extruded onto tension members (42). In another example, the temperatures used for molding a jacket (44) are controlled to induce melt fracture and roughen the surface (46) during the forming process. Other examples include chemically roughening the jacket surface and using localized heating to roughen the surface. The roughened jacket surface improves friction characteristics of a load bearing member assembly.

7 Claims, 4 Drawing Sheets

U.S. PATENT DOCUMENTS

| | | | |
|---|---|---|---|
| 6,295,799 B1 * | 10/2001 | Baranda | 57/221 |
| 6,371,448 B1 | 4/2002 | De Angelis | |
| 6,419,208 B1 | 7/2002 | Baranda et al. | |
| 6,488,123 B2 * | 12/2002 | Pitts et al. | 187/251 |
| 7,367,431 B2 | 5/2008 | Ach | |
| 7,469,774 B2 * | 12/2008 | Ach | 187/411 |
| 2004/0168757 A1 | 9/2004 | Vogt et al. | |
| 2007/0102183 A1 * | 5/2007 | Jotti et al. | 174/68.1 |

FOREIGN PATENT DOCUMENTS

| | | |
|---|---|---|
| JP | 289628 | 3/1990 |
| JP | 5157146 A | 6/1993 |
| JP | 10306852 A | 11/1998 |
| JP | 10324476 A | 12/1998 |
| WO | 03029556 A1 | 4/2003 |
| WO | 03042085 A2 | 5/2003 |
| WO | 2004029343 A1 | 4/2004 |
| WO | 2005068696 A1 | 7/2005 |

OTHER PUBLICATIONS

Written Opinion of the International Searching Authority for International Application No. PCT/US04/08167 mailed Nov. 29, 2005.

Extended European Search Report for Application No. EP 10 01 3551 mailed Jul. 14, 2011.

* cited by examiner

ELEVATOR LOAD BEARING MEMBER HAVING A JACKET WITH AT LEAST ONE ROUGH EXTERIOR SURFACE

BACKGROUND OF THE INVENTION

This invention generally relates to load bearing members for use in elevator systems. More particularly, this invention relates to an elevator load bearing member having a specialized jacket surface.

Elevator systems typically include a cab and counterweight that move within a hoistway to transport passengers or cargo to different landings within a building, for example. A load bearing member, such as roping or a belt typically moves over a set of sheaves and supports the load of the cab and counterweight. There are a variety of types of load bearing members used in elevator systems.

One type of load bearing member is a coated steel belt. Typical arrangements include a plurality of steel cords extending along the length of the assembly. A jacket is applied over the cords and forms an exterior of the assembly. Some jacket application processes result in grooves being formed in the jacket surface on at least one side of the assembly. Some processes also tend to cause distortions or irregularities in the position of the steel cords relative to the exterior of the jacket along the length of the assembly.

In the case of some coated steel load bearing members, an extrusion process for applying a jacket over the cords requires selecting a urethane material having chemical properties that are beneficial for the process of applying the jacket. The resulting jacket, however, may present difficulties in having the desired level of traction when installed in an elevator system. With some urethane materials that are beneficial from a processing standpoint, the resulting coefficient of friction between the jacket and an elevator sheave surface may be higher or lower than desirable for meeting the traction requirements within the hoistway.

Typical processes result in a smooth or glossy exterior of the jacket on the sheave contacting surfaces. In some instances, this smoothness can introduce undesirable adhesion between the jacket and a traction sheave. In most cases, the resulting coefficient of friction between the smooth surface and a traction sheave is not consistent with desired traction performance.

An alternative arrangement is required to minimize or eliminate the undesirable friction characteristics of a urethane jacket. This invention addresses that need.

SUMMARY OF THE INVENTION

In general terms, this invention is a load bearing member for use in an elevator system that includes at least one rough surface on an exterior of a urethane jacket.

One example load bearing member includes a plurality of tension members. A jacket generally surrounds the tension members. The jacket has at least one rough surface on an exterior of the jacket.

In one example, the jacket has a generally rectangular cross-section including a width and a thickness. The rough surface extends across the entire width of the jacket. In one example, the rough surface includes a plurality of impressions that have a depth of at least approximately five microns. In another example, the one surface includes a plurality of grooves extending across the width of the jacket with a section of the jacket between each set of adjacent grooves. Each section includes the rough surface.

An example method of making a load bearing member for use in an elevator system includes roughening at least one surface of a urethane jacket that generally surrounds a plurality of tension members.

In one example, the surface is chemically roughened using a chemical wash or chemical etching technique, for example. In another example, the surface is mechanically roughened using at least one of abrading, rubbing or grinding the jacket surface. In another example, the surface is roughened by embossing the surface.

In another example, the jacket is extruded onto the tension members and a temperature of an extrusion device is controlled to roughen the one surface. In one example, causing melt fracture roughens the surface. In this example, the melt fracture interrupts a surface layer that contains components other than pure polyurethane. The resulting melt fracture prevents the amide components from completely migrating to the one surface, which prevents the one surface from being completely smooth or glossy.

The various features and advantages of this invention will become apparent to those skilled in the art from the following detailed description of the currently preferred embodiments. The drawings that accompany the detailed description can be briefly described as follows.

DETAILED DESCRIPTION OF THE PREFERRED EMBODIMENTS

Figure 1:
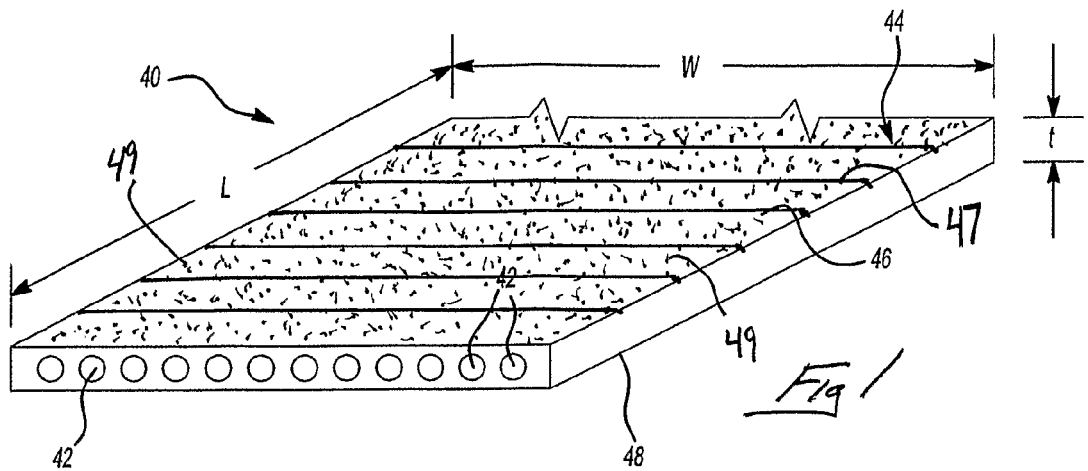
FIG. 1 schematically illustrates a portion of an example load being member designed according to one embodiment of this invention.

FIG. 1 schematically illustrates a load bearing member 40 that is designed for use in an elevator system. A plurality of cords 42 are aligned generally parallel to a longitudinal axis of the load bearing member 40. In one example, the cords 42 are made of strands of steel wire.

A jacket 44 generally surrounds the cords 42. In one example, the jacket 44 comprises a polyurethane-based material. A variety of polymer materials are commercially available and known in the art to be useful for elevator systems. In one example, the preferred urethane material is a thermoplastic polyurethane (TPU). Given this description, those skilled in the art will be able to select a proper jacket material to suit the needs of their particular situation.

The example jacket 44 establishes an exterior length, L, width, W, and a thickness, t, of the load bearing member 40. In one example, the width W of the load bearing member is approximately 30 millimeters and the thickness t is about 3 millimeters. In the same example, the cords 42 have a diameter of 1.65 millimeters. The cords 42 preferably extend along the entire length L of the assembly. In another example, the load bearing member is round, rather than rectangular.

The jacket 44 has exterior surfaces 46 and 48. At least one of the surfaces 46 or 48 will contact a traction sheave and possibly other components within the elevator system as the load bearing member 40 moves to provide the desired elevator cab movement. At least the exterior surface 46 is rough across the width W and along the length L of the example load bearing member 40.

The example assembly includes a plurality of spaced grooves 47 periodically interrupting the surface 46, which result from some belt-making techniques. The portions of the cords at the groove locations may be at least partially exposed and not fully covered with the material of the jacket 44 as known. Even though the grooves 47 interrupt the surface 46, they are not considered to contribute to or to constitute the roughness of the surface 46.

The roughness of the example surface 46 includes a plurality of surface irregularities that make the surface 46 rough (i.e., not smooth). In the illustrated example, a plurality of impressions 49 are disbursed about the surface 46. In some examples, the pattern of the surface irregularities may be established in a controlled manner. In other examples, the surface irregularities are randomly disbursed across the surface 46.

In one example, a plurality of impressions 49 are provided on the surface 46 that are on the order of at least two microns deep. In another example, impressions of about 5 microns deep are included. Deeper impressions or other surface interruptions could be used. Those skilled in the art who have the benefit of this description will be able to select an appropriate depth and pattern, depending on the needs of a particular embodiment. The impressions in an ester based TPU may be more shallow than those in an ether based TPU jacket with similar results, for example.

One example includes a surface 46 that has a texture that generally corresponds to a surface texture on a sheave in the elevator system where the load bearing member is employed. Having a jacket roughness that generally corresponds to a sheave roughness includes a roughness on the jacket surface that is in a general range between about $1/10^{th}$ the roughness of the sheave and about 10 times the roughness of the sheave. By selecting the roughness of the sheave surface and the jacket, a combination of the surface textures ensures the desired traction performance.

Figure 2:
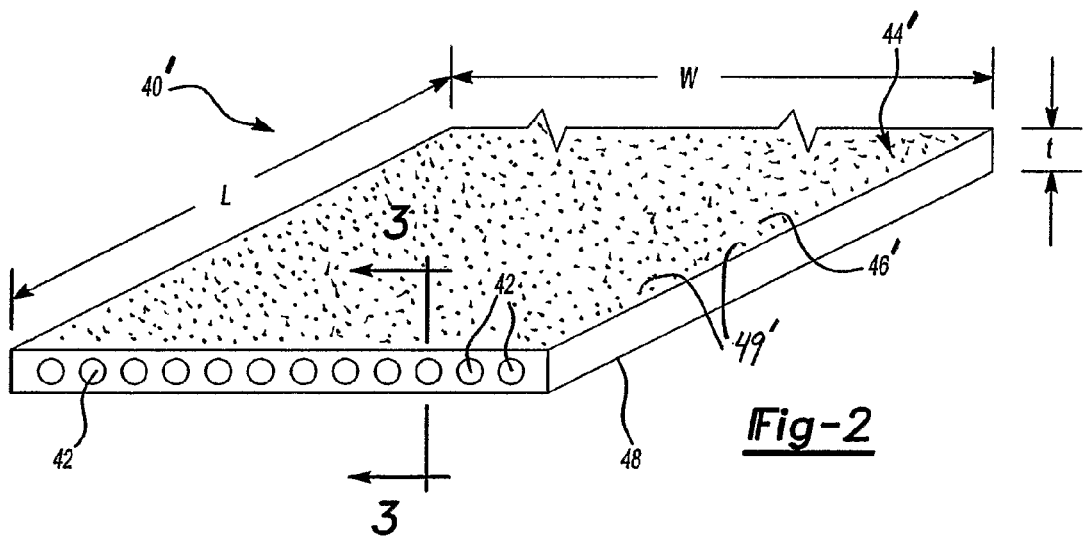
FIG. 2 schematically illustrates a portion of another example load bearing member designed according to another embodiment of this invention.
Figure 3:
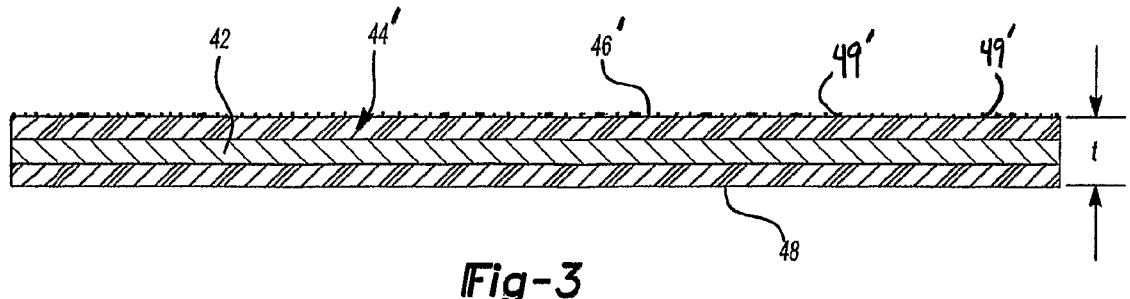
FIG. 3 is a cross-sectional illustration taken along the lines 3-3 in FIG. 2.

FIGS. 2 and 3 show another example embodiment of a load bearing member 40' that is configured as a flat belt but does not include any grooves 47 on the surface 46'. In this example, a plurality of impressions 49' are provided on the surface 46' so that the surface is rough. The example of FIGS. 2 and 3 is made using a different manufacturing technique than that used to make the example embodiment of FIG. 1 so that the grooves 47 are only present in the embodiment of FIG. 1.

The rough surface 46, 46' provides a significantly different coefficient of friction between the load bearing member and a traction sheave compared to a smooth or glossy surface. The rough surface 46 in some examples significantly decreases the traction. Depending on the urethane material selected for making the jacket 44, 44', if the coefficient of friction decreases with increased pressure, the rough surface 46 effectively increases pressure and decreases friction. On the other hand, with some urethane materials, the coefficient of friction increases with increased pressure so that increased roughness may have the effect of increasing friction. In either situation, the roughness of the surface 46, 46' significantly decreases adhesion and, therefore, apparent friction. Those skilled in the art who have the benefit of this description will be able to select an appropriate surface texture (i.e., roughness) to meet the needs of their particular situation taking into account the material selected for making the load bearing member assembly.

Figure 4:
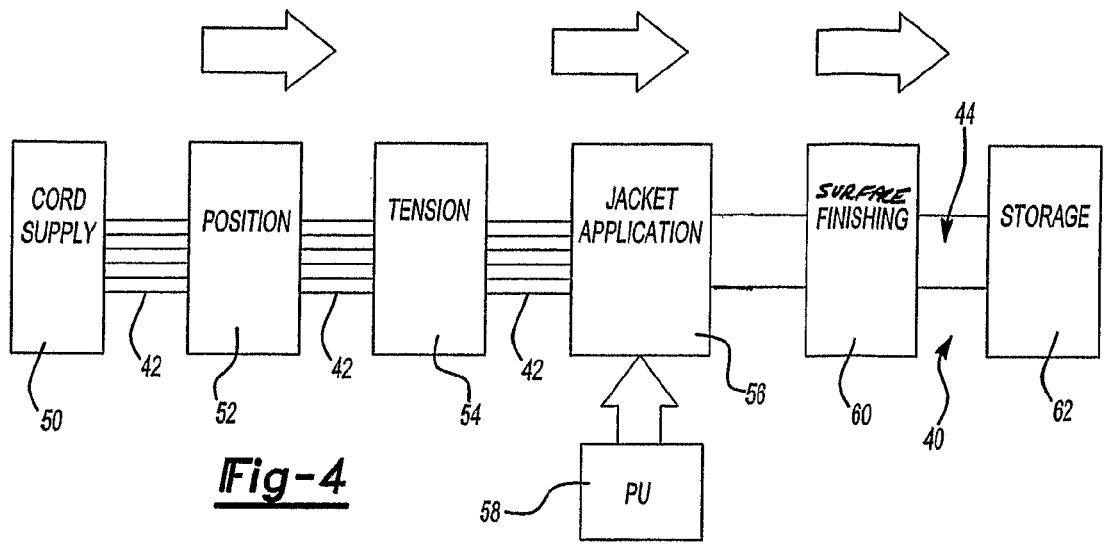
FIG. 4 is a schematic illustration of an example method of making a load bearing member designed according to an embodiment of this invention.

FIG. 4 schematically illustrates a method of making a load bearing member 40. A cord supply 50 provides the cords 42. A positioning device 52 aligns the cords 42 in a desired alignment so that the cords will extend parallel to a longitudinal axis of the load bearing member 40. A tensioning device 54 controls an amount of tension on the cords 42 during the jacket application process. The jacket application station 56 preferably includes a suitable mold or other device for applying the jacket material onto the cords 42. A supply 58 provides the chosen polymer material (PU in the illustrated example) to the jacket application station 56 in a conventional manner. The jacket material may be pressure molded, extruded or otherwise applied to the cords 42. The formed assembly preferably is then processed at a surface finishing station 60. In the illustrated example, the surface finishing station 60 includes at least one device that is used to roughen the surface 46 of the jacket 44. The processing at the finishing station 60 may be dry or wet, depending on desired material handling, for example.

Further details regarding one example consistent with FIG. 4 can be found in the published application WO 2003/042085. The teachings of that document are incorporated into this description by reference.

Figure 6:
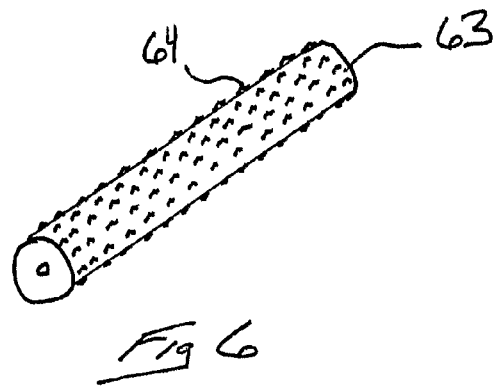
FIG. 6 schematically illustrates one example device used in an embodiment as shown in FIG. 4.

FIG. 6 schematically illustrates one device for roughening the surface 46. A roller 63 includes a surface pattern 64 that embosses the surface 46 with a desired amount of roughness. In one example, the formed load bearing member passes between the roller 63 and another roller (not illustrated) having a smooth surface so that only one side of the jacket 44 has a roughened surface 46. In another example, opposing rollers 63 engage both sides of the jacket 44 so that the surfaces 46 and 48 are roughened. In one example, the roller 63 is freewheeling and moves responsive to movement of the load bearing member as it passes by the roller. In another example, the roller is motorized so that it moves at a controlled rate. A variety of embossing patterns may be used to establish the desired surface texture on the roughened surface. Those skilled in the art who have the benefit of this description will be able to select appropriate arrangements to meet the needs of their particular situation.

Figure 7:
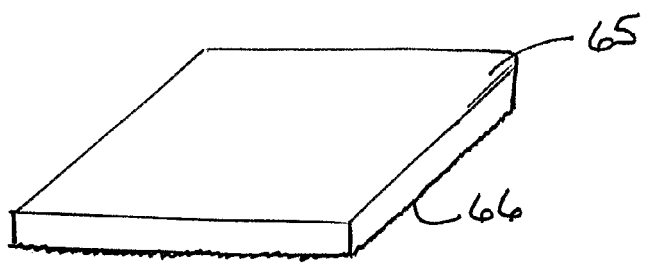
FIG. 7 schematically illustrates another example device used in an embodiment as shown in FIG. 4.

FIG. 7 schematically illustrates another device that is used in an embodiment of this invention for roughening the surface 46 of the jacket 44. In the example of FIG. 7, an abrading pad 65 has a rough surface 66 that is supported in machinery of the finishing station 66 so that the surface 66 engages at least the surface 46 of the jacket 44. In one example, moving machinery causes the abrading device 65 to move rapidly in a circular or reciprocal motion to rub against the jacket 44 for roughening the surface 46.

Figure 8:
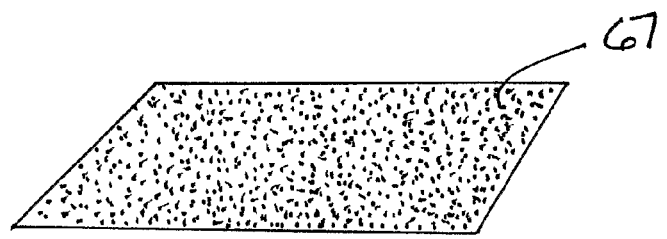
FIG. 8 schematically illustrates another example device used in an embodiment as shown in FIG. 4.

FIG. 8 schematically illustrates another example where an abrasive sheet 67 such as sandpaper is appropriately supported within the finishing station 60 so that it contacts at least the surface 46 for roughening the surface a desired amount.

Figure 9:
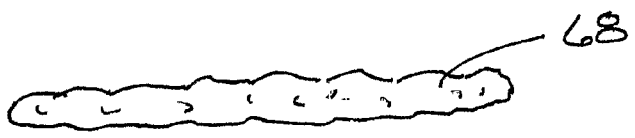
FIG. 9 schematically illustrates another example device used in another example embodiment as shown in FIG. 4.

FIG. 9 schematically illustrates another device for roughening the surface 46. In this example, a buffing pad 68 is supported in an appropriate manner to rub against at least the surface 46 to buff the surface until it has an appropriate amount of roughness.

The particular device or devices shown for roughening the surface 46 may vary depending on the particular material selected for making the jacket and the particular surface texture desired for a given application. Those skilled in the art who have the benefit of this description will realize what will work best for their situation, which may include a combination of more than one of the devices described here or other, similarly functional devices.

Figure 10:
FIG. 10 schematically illustrates another example device used in another example embodiment as shown in FIG. 4.

While the examples of FIGS. 6-9 illustrate mechanical roughening techniques, another example finishing station 60 utilizes a chemical roughening process. FIG. 10 schematically shows an applicator 69 that is useful for applying a chemical to the surface 46 to achieve a desired roughness. Applying a chemical wash to at least the surface 46 is used in one example to partially erode the material on the surface 46 resulting in a roughened surface once the chemical wash is rinsed away, by water for example. In another example, a chemical etching technique is applied to at least the surface 46. Those skilled in the art who have the benefit of this description will be able to select appropriate chemicals and processing times to achieve the desired roughness of at least the surface 46 to meet the needs of their particular situation.

In one example, the finishing station 60 also includes a forming device, a dimensional inspection device and a curing cold water bath where the jacket material and the cords within the material are cooled to a suitable temperature. The finishing station forming device preferably includes a rigid structure that forces the jacket to have a desired exterior configuration (i.e., a rectangular cross section). The inspection device, such as a known laser triangulation measuring device, determines whether the desired geometry was achieved.

The resulting load bearing member 40 preferably is then stored at 62, for example on spools for shipment to various locations for installation in elevator systems. The load bearing member 40 may be precut to specific lengths or may be provided in larger quantities where a technician at the installation selects the appropriate amount of belt material for a particular application.

Figure 5:
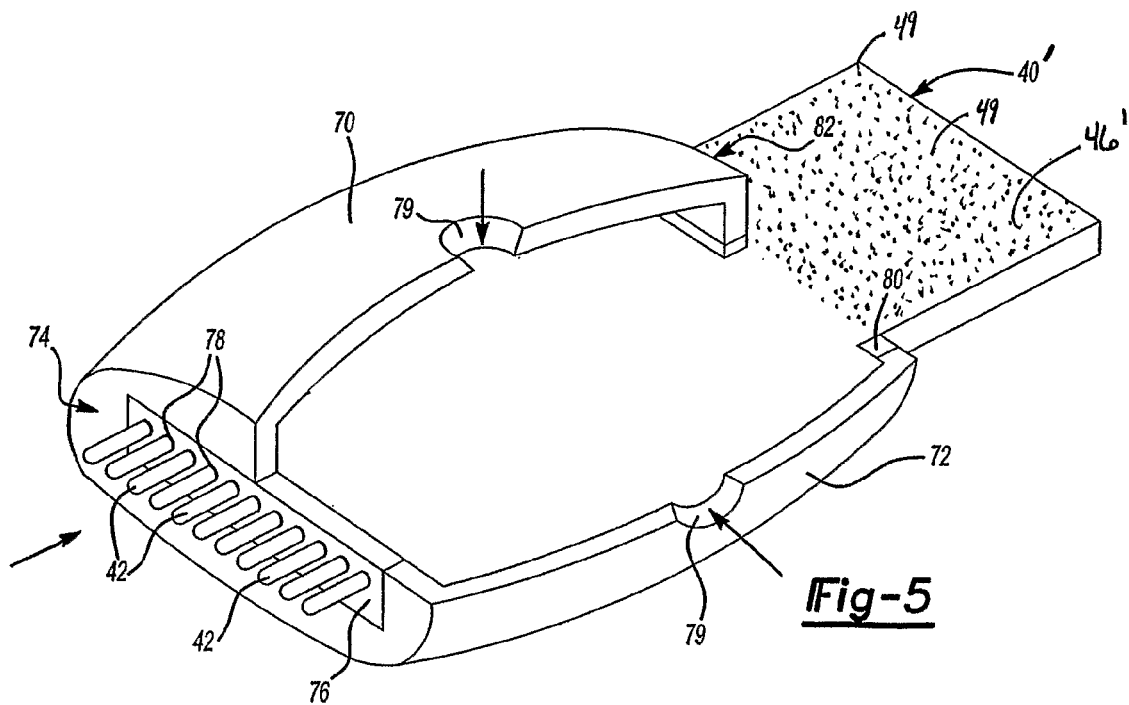
FIG. 5 schematically illustrates an example tool for performing another example method.

FIG. 5 schematically illustrates an example molding device 70 for applying the jacket 44 to the cords 42 and roughening at least one surface of the jacket 44. The example of FIG. 5 may be used in an arrangement as schematically shown in FIG. 4. When the techniques associated with the example of FIG. 5 are used, the finishing station 60 may not require any device for roughening the surface 46. As will be described, the surface roughness can be established during the extrusion process where the jacket 44 is applied to the cords 42. Additional roughness may be accomplished using a roughening device within the finishing station 60 even where a technique as schematically shown in FIG. 5 is employed.

The example forming device 70 of FIG. 5 includes a mold housing 72 having an input side 74. A cord positioning device 76 preferably is situated at the input side 74. The cord positioning device 76 includes a plurality of openings 78 through which the cords 42 are fed into the device 70. The openings 78 preferably are accurately machined or otherwise formed so that a close tolerance is kept between the exterior of the cords 42 and the interior of the openings 78. Having a tight fit between the openings 78 and the cords 42 prevents backflow of the jacket material during the molding process.

The mold housing 72 includes one or more openings 79 through which the jacket material is applied to the cords using pressure injection. As known in the art, pressure injection can be used for molding materials such as polyurethane when the material is suitably heated. Given this description, those skilled in the art will be able to select appropriate conditions for achieving a desired result.

The molding device 70 includes a temperature controlled opening 80 at an output side 82 of the mold housing 72. The opening 80 preferably is shaped to control the exterior shape and surfaces on the load bearing member 40. Moreover, the opening 80 is temperature controlled for achieving a desired effect on the exterior of the jacket 44. In one example, the temperature within the mold housing 72 is higher than the temperature of the opening 80. By having a reduced temperature near the exit of the mold 72, so-called melt fracture occurs. During melt fracture in this example, the surface 46 of the jacket 44 becomes roughened.

Reducing the temperature of the opening 80 relative to the temperature in the mold housing 72 effectively cools the surfaces of the jacket 44 as the assembly exits the mold housing 72. During such cooling, a portion of the jacket material is effectively solidified against the wall of the opening 80 and then torn away as the assembly continues through the mold machinery. This effect induces or creates turbulence within the jacket material and prevents the components within the polyurethane stock material that are not pure polyurethane from completely migrating to the surface 46 of the jacket 44. It is known that during formation of most polyurethane materials, an amide rich layer forms on an exterior. The various additives to a polyurethane material including waxes, mold release agents, etc., typically migrate to the exterior surface and form a thin layer, which may be less than 0.1 millimeter, containing "impurities" added to the stock of polyurethane. Inducing melt fracture (by lowering the temperature of the opening 80 relative to the rest of the mold, for example) allows the typical amide-rich layer to only partially form and results in an irregular surface 46 that has a roughness sufficient for accomplishing the objectives of an embodiment of this invention. The micro-irregularities in the surface 46 caused by melt fracture may include impressions 49 on the order of five microns, which is sufficient to enhance the friction characteristics of the jacket 44 for some polyurethane materials.

Figure 11:
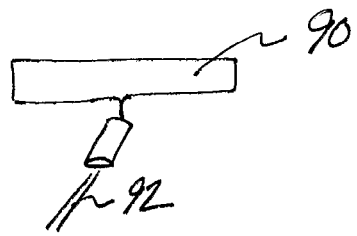
FIG. 11 schematically illustrates another example device used in another example embodiment similar to that shown in FIG. 4.

In another example, localized heating of the surface 46 is used to roughen the surface 46 by causing localized vaporizing, melting or burning of the surface material of the jacket 44. FIG. 11 schematically shows a precise heat source 90 that heats at least selected portions of the surface 46 to cause the desired localized change in the surface. In one example, the heat source 90 directs a laser beam 92 at the jacket surface. In another example, the heat source 90 directs an electron beam 92 at the jacket surface.

According to one embodiment, the heat source 90 is positioned within or before the finishing station 60 of FIG. 4. Using localized heating may be most advantageously used before the jacket material is cooled in a water bath, for example. Given this description, those skilled in the art will be able to select an appropriate arrangement and appropriate parameters to meet the needs of their particular situation.

Whether roughening the surface 46 during jacket formation or after the polyurethane is at least partially cooled, the resulting non-smooth, non-glossy surface provides enhanced traction control. The disclosed techniques can be used to provide a variety of surface textures.

The preceding description is exemplary rather than limiting in nature. Variations and modifications to the disclosed examples may become apparent to those skilled in the art that do not necessarily depart from the essence of this invention.

The scope of legal protection given to this invention can only be determined by studying the following claims.

We claim:

1. A method of making a load bearing member for use in an elevator system, comprising:
    chemically roughening at least one surface of a polymer jacket that generally surrounds a plurality of tension members, wherein chemically roughening includes at least one of applying a chemical to the one surface or chemically etching the one surface.

2. A method of making a load bearing member for use in an elevator system, comprising:
    roughening at least one surface of a polymer jacket that generally surrounds a plurality of tension members by extruding the polymer onto the tension member and causing melt fracture during the extruding.

3. A method of making a load bearing member for use in an elevator system, comprising:
    roughening at least one surface of a polymer jacket that generally surrounds a plurality of tension members by forming the jacket about the tension member and reducing a temperature of a forming device to thereby roughen at least the one surface.

4. A method of making a load bearing member for use in an elevator system, comprising:
    roughening at least one surface of a polymer jacket that generally surrounds a plurality of tension members by heating localized portions of the one surface.

5. The method of claim 4, wherein the localized heating includes at least one of melting, vaporizing or burning some of the jacket material at the localized portions.

6. A load bearing member for use in an elevator system, made by the method comprising:
    roughening at least one surface of a polymer jacket that surrounds at least one tension member by heating localized portions of the one surface.

7. The load bearing member of claim 6, wherein the localized heating includes at least one of vaporizing, melting or burning the jacket material at the localized portions.

* * * * *